O. E. HALLSTROM.
OUTLET BOX FITTING.
APPLICATION FILED JULY 5, 1917.
1,286,605.
Patented Dec. 3, 1918.
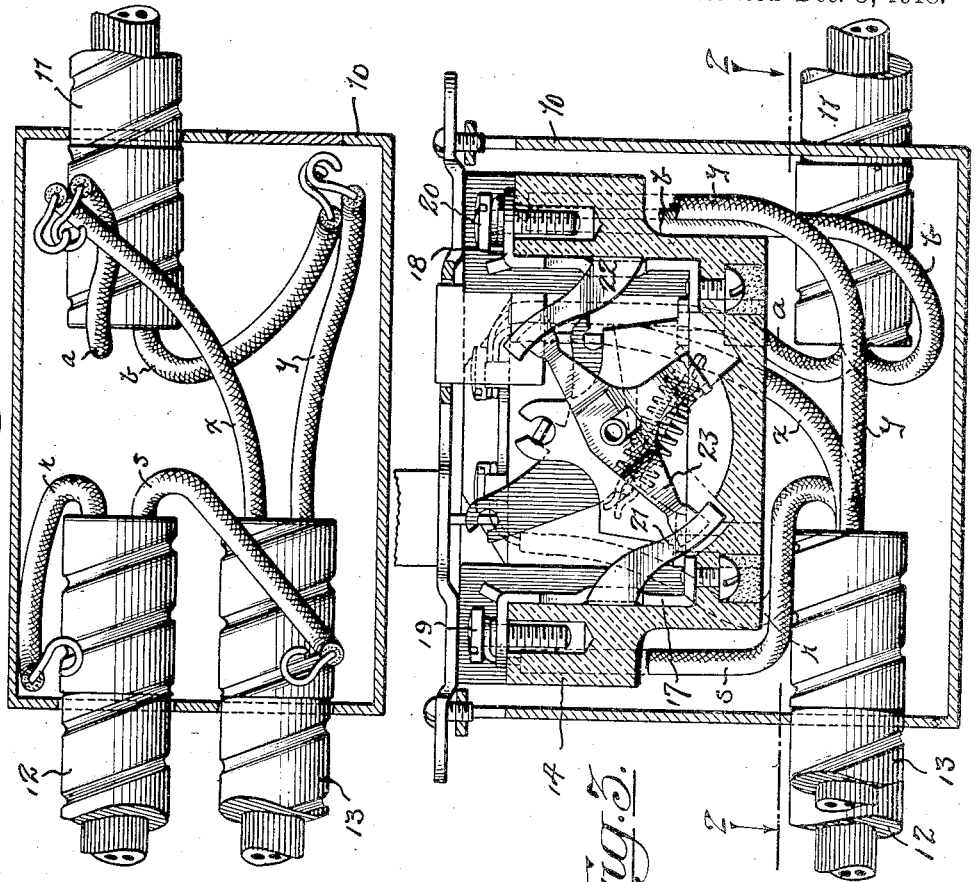
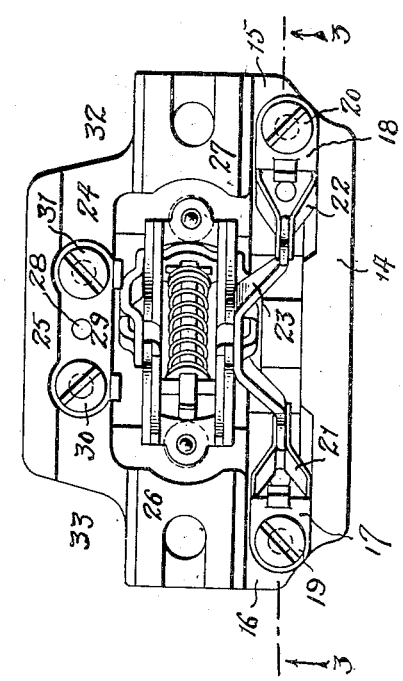
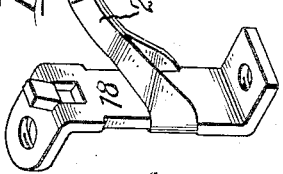
Inventor
OSCAR E. HALLSTROM
by his Attorneys
Howson and Howson

UNITED STATES PATENT OFFICE.

OSCAR E. HALLSTROM, OF STRATFORD, CONNECTICUT, ASSIGNOR TO THE BRYANT ELECTRIC COMPANY, OF BRIDGEPORT, CONNECTICUT, A CORPORATION OF CONNECTICUT.

OUTLET-BOX FITTING.

1,286,605.

Specification of Letters Patent.

Patented Dec. 3, 1918.

Application filed July 5, 1917. Serial No. 178,825.

*To all whom it may concern:*

Be it known that I, OSCAR E. HALLSTROM, a citizen of the United States of America, and residing at Stratford, in the county of Fairfield and State of Connecticut, have invented a certain new and useful Improvement in Outlet-Box Fittings, of which the following is a specification.

The present invention relates to an outlet box fitting, and particularly to a combined switch and connection block, the object of my invention being to provide a compact, economical, and efficient fitting, adapted to be mounted in a one-gang outlet box, and through which both switched and unswitched connections may be established between the wires leading to the box.

In the accompanying drawings,

Figure 1 is a plan view of the fitting alone, with the push buttons for operating the switch, removed.

Fig. 2 is a horizontal section through an outlet box on the line 2—2, Fig. 3, and showing wiring connections.

Fig. 3 is a vertical section through the box, showing the fitting in position therein, and taken on the line 3—3, Fig. 1.

Figs. 4 and 5 are perspective views of details.

It is frequently convenient to connect wires at a switch box, although the circuit does not pass through the switch. It has been customary heretofore to solder and tape these "straight-through" connections at the outlet box beneath the insulating body of the switch. This operation is not only difficult to perform in a workmanlike manner, but often results in crowding the bottom of the box with taped wires thus connected, so that it becomes difficult properly to install the switch body. The present fitting permits these connections to be readily made through a connecting strap with binding screws mounted on the insulating body of the switch, thus not only facilitating the operation, but also relieving the box of congested wire connections beneath the switch body and affording a more workmanlike installation than has hitherto been possible within the compact area of a one-gang outlet box.

As here shown, the outlet box 10 is of common type, to which three armored cables 11, 12 and 13 are led, each cable having a pair of wires, *a b*, *r s*, and *x y*, respectively.

Assuming that it is desired to lead the current from the incoming wires *a* and *b* directly to the outgoing wires *r*, *x*, and *y*, the usual installation would involve the soldering and taping of the bared ends of these wires in the space afforded at the bottom of the box 10, below that occupied by the switch body.

The present fitting comprises a cup shaped insulating body 14, having on one side depressed ledges 15 and 16, upon which rest the offset upper ends of the straps 17 and 18, which carry binding screws 19 and 20, and switch terminals 21 and 22. Within the switch chamber is mounted any suitable switch mechanism, that here shown being of the push button type, corresponding in its general features to that shown in the co-pending application, Anderson, Serial No. 174,743, with the distinction, however, that the switch here shown is of the single pole type, and therefore has but a single switch blade, 23. On the opposite side of the body 14 from that occupied by the switch terminals and switch blade is a depressed ledge 24, extending the length of the body and thus affording a long wire channel between the shoulder 25 and the central end bosses 26 and 27. Upon the ledge 24 is secured, by screws 28, a connecting strap 29 carrying any number of binding screws; two, viz. 30 and 31, are here shown, inasmuch as this number is ordinarily sufficient for the "straight-through" connections to be established. The base 14 is also recessed at 32 and 33 to afford end clearances for the wires which are led to the connecting strap 29. The arrangement of the wires in the example here given is indicated in Figs. 2 and 3, the incoming wire *a* being carried up and secured to the binding screw 31. The outgoing wire *x* is carried beneath the insulating body and up through channel 32 to the same binding screw 31. The second outgoing wire *r* is carried up through channel 33 to the binding screw 30, thus establishing a connection with the incoming wire *a* through the strap 29. The incoming wire *b* is led to the binding screw 20 for switch terminal 22, and the outgoing wire *y* is connected to the same terminal. The connection between *b* and *y* is thus direct.

The outgoing wire *s* is connected to the binding screw 19 which takes its current through the switch blade 23 and is therefore dependent upon the position of the switch for its circuit connection.

It is obvious that if cable 12 were the incoming line, then the circuits through wire *b* of cable 11 and wire *y* of cable 13 would be controlled by the switch, while the circuits through wires *a* and *x* would be completed through their connection to the strap 29.

In addition to affording a very convenient and speedily made connection for the "straight-through" wires, the attachment of all the wires to binding screws, either for the switch terminals or for the plate 29, greatly facilitates the alteration of the connections to the fitting or even the substitution of a different type of fitting if such is desired. Obviously the invention is not limited to the precise arrangement of the cables indicated, or to any particular switch mechanism for establishing circuit between the switch terminals, the underlying thought being to provide a combined switch and connecting block of the general type illustrated, which may be variously modified without departing from what I claim as my invention.

I claim:

1. An electric fitting comprising an insulating body adapted to be mounted in an outlet box, associated wire and switch terminals mounted on said body, a switch mechanism for making and breaking connections between the switch terminals and an independent conducting strap mounted on said body and means for establishing therethrough a "straight-through" connection between wires led to the box.

2. An electric fitting comprising an insulating body adapted to be mounted in an outlet box, associated wire and switch terminals mounted on said body, a switch mechanism for making and breaking connections between the switch terminals and an independent conducting strap mounted on said body and binding screws tapped into said strap for securing a "straight-through" connection between wires led to the box.

3. An electric fitting comprising a cup shaped insulating body, associated wire and switch terminals mounted on one side of the switch chamber, a switch mechanism within the chamber for making and breaking connection between the switch terminals, and a conducting strap mounted on the opposite side of the chamber and binding screws carried by said strap for securing thereto wires making a "straight-through" connection at the box.

4. An electric fitting comprising a cup shaped insulating body, having to one side of the chamber a depressed ledge, wire channels leading thereto, a conducting strap secured to said ledge and binding screws tapped into said strap for securing a "straight-through" connection of wires led to the fitting, together with a switch mechanism within the chamber of said body, and associated wire and switch terminals mounted at the opposite sides of said chamber from the said strap.

In testimony whereof I have signed my name to this specification.

OSCAR E. HALLSTROM.